Nov. 16, 1965    K. R. TAYLOR ETAL    3,218,211
METHOD OF MAKING LIP SEALS AND SECURING SAME TO CASING ELEMENTS
Filed Sept. 9, 1964    2 Sheets-Sheet 1
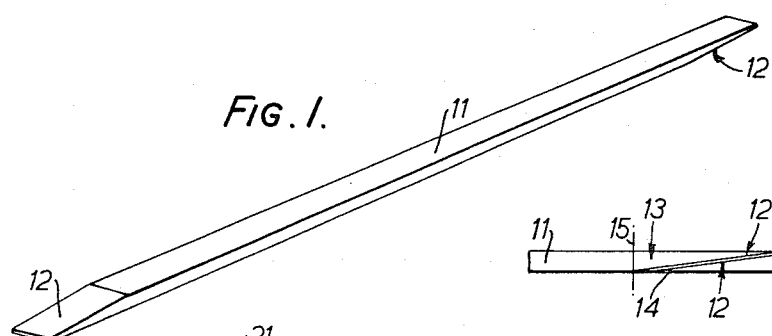
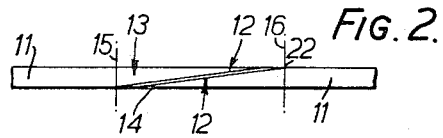
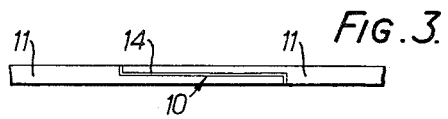
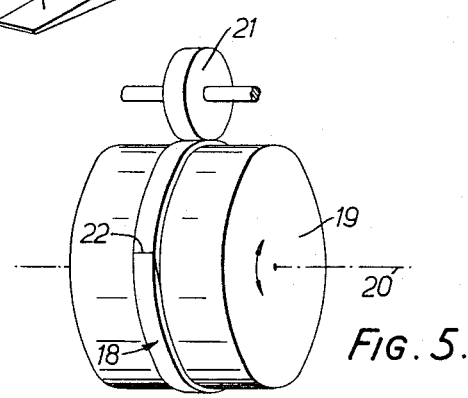
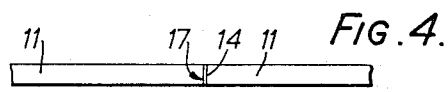
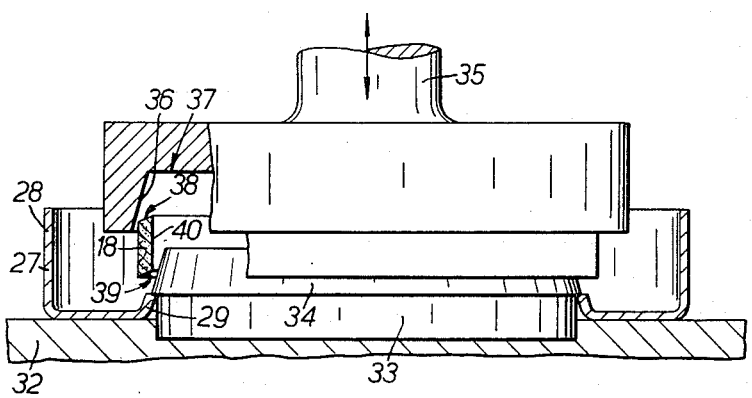
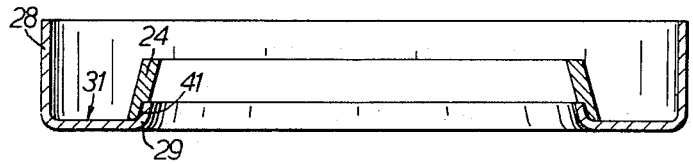
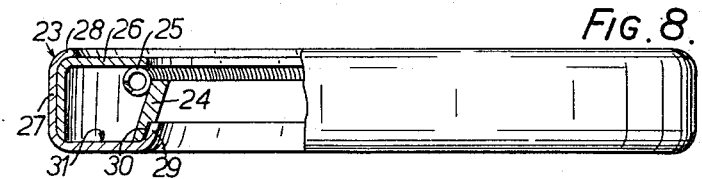

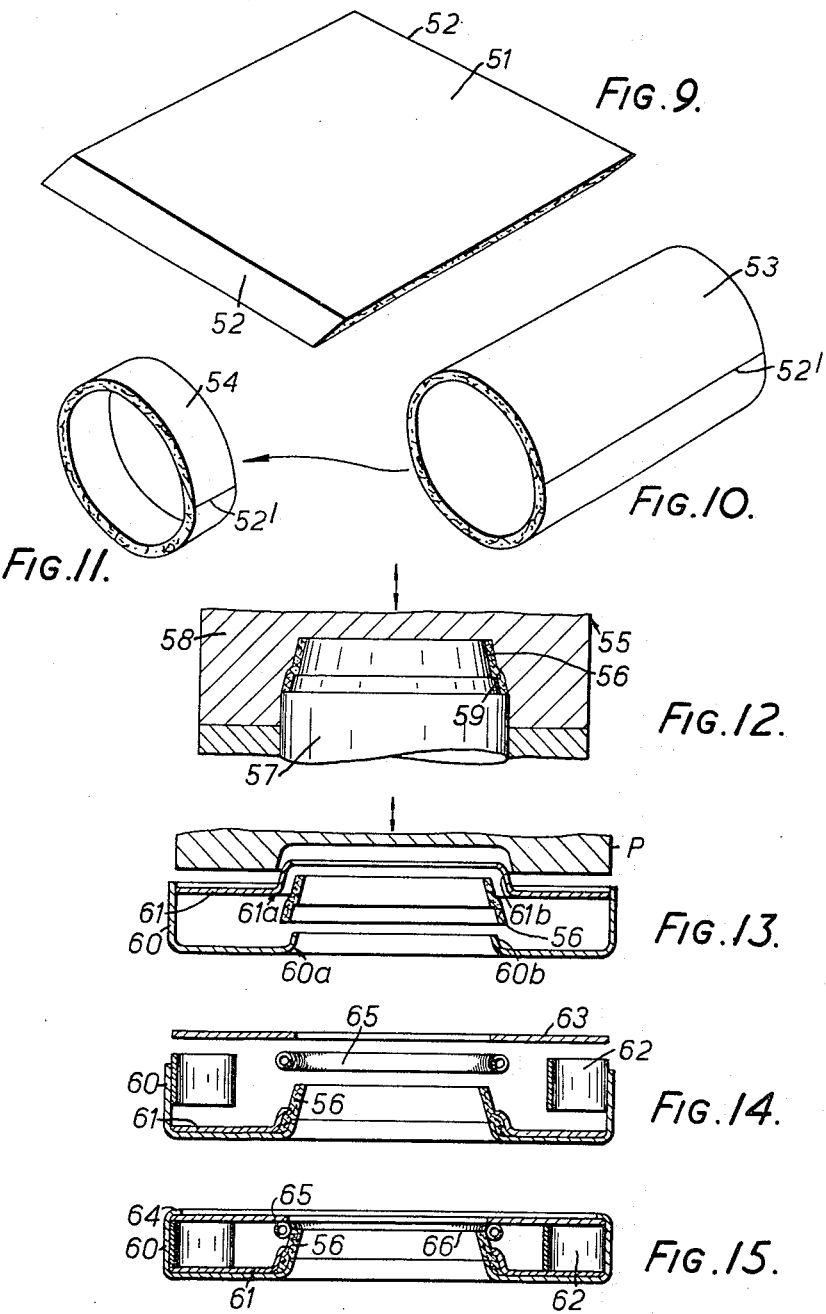

United States Patent Office 3,218,211
Patented Nov. 16, 1965

3,218,211
METHOD OF MAKING LIP SEALS AND SECURING SAME TO CASING ELEMENTS
Kenneth R. Taylor, Redditch, and Harold E. Crockett, Birmingham, England, assignors to Super Oil Seals and Gaskets Limited
Filed Sept. 9, 1964, Ser. No. 395,184
6 Claims. (Cl. 156—217)

This is a continuation-in-part of patent application Serial No. 104,373 filed April 20, 1961, now abandoned.

The invention concerns lip seals of the type comprising a casing and a leather element carried by the casing, an edge of the leather element constituting a circular, resilient sealing lip, e.g. for sealing against oil, water, grease and so on. The sealing lip may be adapted to engage the outer cylindrical surface of a member, such as a shaft, or to engage an annular recess, relative rotation taking place between the seal and the member which is engaged by the sealing lip. However, the seal may be used when no such rotation occurs. There may be provided a means, such as a garter spring, leaf spring, wire spring or resilient O-ring, for pressing the sealing lip against the member to be sealed.

At present it is usual for lip seals of the type referred to to incorporate a sealing leather of L-section, one limb of the L-section leather being secured to the casing of the seal and the other limb constituting the sealing lip. Customarily the leather is clamped between the two members of the casing and is so secured to the casing.

The L-section sealing leather is made by cutting a disc from a hide and thereafter shaping the disc to a flanged cup form, the central portion of which is cut out so as to produce the L-section member referred to. Prior to forming the leather disc the latter is abraded or otherwise treated to remove surface grooves, pits or the like so that in use leakage paths along the grooves are eliminated.

There is a very large wastage of the hide represented by the portions thereof left over after the discs have been cut out from the hide and there is a further considerable wastage of the hide represented by the central portions cut out from the formed member.

An object of the invention is to reduce or eliminate the wastage referred to.

A further object of the invention is to provide a simpler method of manufacturing a lip seal incorporating a leather sealing member.

More particularly the invention provides a method of making a lip seal of the type comprising a casing and a leather element carried by the casing to present an edge constituting a circular resilient sealing lip, the method including cutting a blank of leather to correspond in dimension between two opposite ends substantially to the final diametric dimensions of the element, forming said ends in conjoining relation joining said ends using a thermosetting rubber base resin adhesive which has substantially the same temperature/flexibility characteristics as the leather over substantially the range of temperatures at which the leather retains adequate sealing flexibility, thereby to form a cylindrical ring, shaping said ring by compression to present a frusto-conical form of the element, and securing said element by a portion thereof at the radially outer edge of the frusto-conical form to said casing with the radially inner edge of the frusto-conical form constituting the sealing lip.

It is preferred that the sealing edge portion of the leather element is resiliently engaged by a garter spring, leaf spring, wire spring or resilient O-ring.

The characteristics of leather change with temperature. At low temperatures (e.g. substantially below freezing point) the flexibility or pliability of leather is much reduced while at high temperatures—e.g. somewhat above boiling point—the flexibility of the leather is impaired and in time the leather becomes permanently brittle to some extent, the rate of change of the flexibility being dependent, among other things, upon the temperature. It is commonly required that lip seals to be capable of functioning satisfactorily under a wide temperature range and to this end the adhesive referred to is selected so that it provides the characteristics indicated above. In this way the functioning of the seal is not impaired to a greater extent by the use of the adhesive than would otherwise be the case.

Methods of making lip seals according to the invention are hereinafter described by way of example with reference to the accompanying drawings in which:

FIG. 1 illustrates, for one method, a leather blank of strip form cut to size and scarfed, FIGS. 2 to 4 various forms of joint of the cylindrical leather ring formed from such strip, FIG. 5 an abrading step in the treatment of the ring, FIGS. 6 and 7 the pressing of the leather ring into the frusto-conical form element and its securement to the casing, FIG. 8 a partial cross-section of the assembled lip seal, FIG. 9 illustrates, for an alternative method, a leather blank of wider form cut to size and scarfed, FIG. 10 such blank formed into a tube, FIG. 11 a cylindrical leather ring parted-off from the tube, FIG. 12 the pressing of the leather ring into the frusto-conical form element, and FIGS. 13, 14 and 15 show subsequent stages "in assembly" of a lip seal incorporating such leather element.

Referring first to FIGS 1 to 8, as a blank of leather in the form of a strip 11 has tapered ends 12, the strip being formed into a ring with the grain surface of the leather outermost, the ends 12 overlapping to form a scarf joint, generally indicated at 13 in FIG. 2. The overlapping surfaces 12 of the strip are united by an adhesive 14. The adhesive is a ruber base thermosetting resin and has the characteristics as indicated above; and also that under heat and pressure the ends of the strip 11 will be securely united. Thus the flexibility of the portion of the ring between the lines 15, 16 (i.e. the portion of the ring which has the scarf joint) has substantially the same flexibility as the rest of the leather ring within the working temperature-range.

Instead of a scarf joint the strip 11 may be stepped, as shown in FIG. 3, and the surfaces united by adhesive 14 to form an overlapped joint 10. Again as shown in FIG. 4 the ends of the strip 11 may form a butt joint 17, the adhesive 14 uniting the ends as already described. It is preferred, however, that the joint be as shown in FIG. 2.

FIG. 5 diagrammatically illustrates the step of treating the outer surface of the leather ring, which is generally indicated by the reference numeral 18, to remove grooves, pits or the like surface imperfections. The ring 18 is mounted upon a mandrel 19 which is rotatably driven about the axis 20 in any known or convenient manner. An abrading wheel 21 engages the surface of the ring 18. It will be observed that the abrading action is in the direction in which the outer tapered edge of the scarf joint points less so that there is little or no possibility that the abrading wheel 21 will raise the edge 22 of the overlapping, tapered end 12.

The lip seal is shown in cross section in FIG. 8 and comprises a casing, generally indicated at 23, the sealing leather element 24 (which is made from the ring 18 as will shortly be described) and a garter spring 25. The casing 23 comprises an inner sheet metal ring member 26 and an outer sheet metal ring member 27. The edge 28 of the outer ring 27 is rolled over (or otherwise folded over) the inner ring 26 and the ring 27 comprises a lipped portion of angle section including an inwardly-directed lip 29, a surface 30 thereof being at an oblique angle to the adjacent surface 31.

Reverting now to FIG. 6: the member 27 is placed upon a bed 32 and is positioned by a male die 33, the lip 29 engaging with the die. The upper part 34 of the die 33 is of frusto-conical formation.

Co-acting with the die 33 is a female die 35 having a frusto-conical opening part 36 and an end shoulder 37. The die 35 may be raised and lowered in any suitable or convenient manner, e.g. by a hydraulic jack. The conical surfaces of the parts 34, 36 correspond so that when the dies are closed the surfaces are spaced apart by a predetermined amount and are substantially parallel.

The ring 18, after the treatment described with reference to FIG. 5, is mounted between the dies 33, 35 (as shown diagrammatically in FIG. 6) and thereafter the die 35 is lowered so that the upper end edge 38 of the ring 18 is engaged by the shoulder 37 of die 35 and the ring is forced downwardly thereby over the lip 29. At the same time the ring 18 is compressed between the parts 34, 36 and forced to frusto-conical form. During this operation the lower end edge portion 39 is pressed against the surface 31 and the marginal portion 40 of the inner side face of the ring 18 next to the edge portion 39 is pressed against the confronting surface 30 of the lip 29.

Prior to the assembly procedure described with reference to FIG. 6 an adhesive, which is preferably the same adhesive as is used for forming the scarf joint 13, is applied to the portions 39, 40 and/or to the surfaces 30, 31 so that when these portions are pressed together under suitable conditions of heat and pressure the frusto-conical element 24 produced from the cylindrical ring 18 is, at the same time, united with the casing ring 27. In FIG. 7 the frusto-conical element 24 is shown united to the ring 27 by the adhesive 41.

The dies 33, 35 may be heated electrically or by steam or in any other convenient manner, a temperature control being preferably incorporated automatically to maintain a preselected temperature for effective bonding of the leather to the ring 27. The pressure will also be selected to ensure that the cylindrical ring 18 is effectively deformed to produce the frusto-conical element 24 and so that the leather is compressed between the parts 34, 36 and is additionally compressed between the lip 29 and the part 36. An effect of compressing the leather is to increase its resilience and give a strong wearing action.

The assembly of FIG. 7 receives the inner member 26 and thereafter the edge 28 is folded over to produce the lip seal, the garter spring 25 being fitted as convenient, as shown in FIG. 8.

By such method wastage of the hide is materially reduced, if not almost entirely eliminated.

Instead of a helical coil garter spring a resilient ring of rubber or rubber-like material may be used (for instance made from a synthetic rubber). Such a ring of rubber-like material has been referred to above as a resilient O-ring.

The leaf spring previously referred to may be an L-section metal ring one limb of the section being planar and the other being frusto-conical. Each limb is formed with a set of angularly-spaced resilient fingers which project outwardly from the junction of the limbs, the sets being so arranged that they alternate both sets being in zig-zag formation. The planar limb is clamped against surface 31 e.g. by an L-section ring member (similar to ring 26—see FIG. 8) one arm of which overlies the planar limb and the other arm of which overlies ring 26, the ring member being held in position by edge 28. The fingers of the frusto-conical limb press against the outer surface of the sealing leather element 24.

A modification of the spring described in the preceding paragraph comprises an L-section metal ring with resilient fingers in combination with a garter spring or a resilient O-ring. Each finger of the frusto-conical limb has an outward lip at free end to receive the garter spring or O-ring and hold it in position.

The wire spring previously mentioned is of similar form to the leaf spring i.e. has a planar and frusto-conical limb with fingers made by bending from spring wire to a generally castellated outline. The fingers are joined together the spring being made from a single length of wire.

The essential characteristics of the adhesive have been mentioned above. Additionally the adhesive is resistant to attack by oils and greases generally used in the engineering field.

Referring now to FIGS. 9 to 15, a rectangular blank 51 is cut from a leather hide. The width dimension of the rectangle is determined by the desired diameter dimension of the final seal. The length of the rectangle is not critical; it may be for example 9 inches. The pair of opposite end edges 52 delimiting the width are chamfered or scarfed and an adhesive is applied to such scarfed edges. The adhesive is such that it is non-tacky so that the blanks carrying the adhesive can be stored for considerable periods one flat on top of another.

A blank is taken and folded around a mandrel of required diameter so that the gummed edges 52 overlap at 52′. A heated pressure bar is applied to the overlapped edges to press these against the mandrel and produce a cylindrical leather tube 53 of the chosen length and the desired diameter.

The adhesive comprises polyurethane rubber as a main solid component with anhydrous ethyl acetate as solvent, and a separately added curing agent consisting of a solution of an isocyanate complex in ethyl acetate. The adhesive forms a joint which has the temperature/flexibility characteristics, and resistance to attack by oils and greases, as indicated above.

The outer surface of the tube 53 corresponds to the smooth surface of the hide. The tube is mounted on a rotatable mandrel and is brought against an abrading cylinder, e.g. a cylinder having a strip of emery cloth wrapped round its surface, which is rotatably driven while the mandrel with the tube is reciprocated axially. In this way the outer smooth surface of the tube is roughened and at the same time the scarf joint 52′ is cleaned. This abrading procedure is generally comparable with that illustrated in FIG. 5.

The tube 53 is next mounted on a rotatable mandrel associated with cutting means which trims one end of the tube and thereafter parts-off the tube into cylindrical rings 54 of predetermined depth. Each ring 54 is then turned inside-out so that the abraded surface is inside, and then placed in a heated die 55 and compressed into the substantially frusto-conical form of the leather element 56 of the lip seal as seen in FIG. 12. The die 55 comprises relatively reciprocable male and female parts 57 and 58 respectively which form the element 56 with a radially outwardly stepped edge portion 59.

The lip seal casing comprises co-axial outer and inner sheet metal ring members 60 and 61 each presenting a lipped portion 60a, 61a of angle section. Such members are forced e.g. using a press member P as shown in FIG. 13 into the nesting relation shown in FIG. 14 with the edge portion 59 of the leather element interposed between the opposed surfaces 60b, 61b of the lipped portions, the surface 61b overlying the step of the edge portion 9. The leather element is thus clamped in position between the ring members 60 and 61 and thereby secured to the casing without use of adhesive for such purpose. As seen in FIG. 15, the ring members 60 and 61 are maintained in nested relation by a corrugated spacer ring 62 pressed down onto the ring member 61 by an annular disc 63 over the radially outer edge of which is rolled or otherwise folded the upper edge portion 64 of the outer ring member 60 which is generally cup-shaped. A garter spring 65 is fitted during such assembly.

The die 55 may be heated electrically or by steam or in any other convenient manner, a temperature control being preferably incorporated to maintain automatically a preselected temperature, such as indicated in the first method. The pressure is selected to ensure that the cylindrical ring is effectively deformed by compression into the frusto-conical element. It is important that especially the working edge 66 of the leather element, which is to engage a shaft say, be compressed during formation in contra-distinction to a stretching operation. If the fibres of the leather stretched the resilience of the leather is reduced and the leather has little if any give, such resulting hard leather having a strong wearing action on the shaft. By increasing the resilience by compressing the leather as indicated a more resilient and effective seal is obtained.

Any suitable variant of the spacer ring 62 may be used provided it has the desired effect.

Instead of forming the leather tube and thus the leather ring and element with a scarf joint, a stepped-overlap, butt, or other suitable form of joint may be adopted such as in FIGS. 3 and 4.

The garter spring may be a helical coil spring or a resilient ring of rubber or rubber-like material. Alternatively or additionally, any suitable metal leaf spring arrangement can be used such as described above with reference to the embodiment of FIGS. 1 to 8.

Instead of pressing the leather ring 54 into the substantially frusto-conical element with stepped edge, the element may be formed with a radially outwardly extending flange portion which could be held clamped between ring members such as 60, 61 without the necessity for providing the lipped portions on such members. It will be noted that the members 60, 61 are held in the required co-axial relation by the tight engagement of the outer edge of member 61 within the cylindrical wall of the cupped member 60.

The leather ring 54 produced as just described with reference to FIGS. 9 to 11 may alternatively be formed into a leather element and incorporated in a lip seal in the manner described with reference to FIGS. 6 to 8.

With the frusto-conical form of leather element the same size of leather ring or element may be used for a designated shaft diameter, regardless of differing outside diameters of seal for which different casing diameters will be required.

We claim:

1. A method of making a lip seal of the type comprising a casing and a leather element carried by the casing to present an edge constituting a circular resilient sealing lip, the method including cutting a blank of leather to correspond in dimension between two opposite ends substantially to the final diametric dimensions of the element, forming said ends in conjoining relation, joining said ends using a thermosetting rubber base resin adhesive which has substantially the same temperature/flexibility characteristics as the leather over substantially the range of temperatures at which the leather retains adequate sealing flexibility, thereby to form a cylindrical ring, shaping said ring by compression to present a frusto-conical form of the element, and securing said element by a portion thereof at the radially outer edge of the frusto-conical form to said casing with the radially inner edge of the frusto-conical form constituting the sealing lip.

2. A method according to claim 1 including securing said element by said radially outer edge portion to said casing using a thermosetting rubber base adhesive with application of pressure simultaneously with the compression of said ring to present the frusto-conical form of said element.

3. A method according to claim 1 comprising forming a cylindrical tube by joining said ends of said blank, and cutting the cylindrical ring from the cylindrical tube.

4. A method according to claim 3 wherein the compression of said ring to present the frusto-conical form of said element is effected at a separate step prior to securing said element to said casing.

5. A method according to claim 4 including clamping said radially outer edge portion of said element between co-axial ring members of said casing to secure said element to said casing.

6. A method according to claim 5 including forming each of said ring members with a lipped portion of angle section and forcing said members into nesting relation with said radially outer edge portion of said element interposed between opposed surfaces of said lipped portions.

References Cited by the Examiner
UNITED STATES PATENTS

| 1,906,829 | 5/1933 | Acly | 156—293 |
| 2,006,377 | 7/1935 | Wheeler | 156—196 XR |
| 2,110,303 | 3/1938 | Marshall | 156—217 XR |

EARL M. BERGERT, *Primary Examiner.*